United States Patent
Abdulkhair et al.

(10) Patent No.: US 12,540,081 B1
(45) Date of Patent: Feb. 3, 2026

(54) COPPER HYDROXY NITRATE/ CALCIUM SILICATE @GRAPHITE-PHASE CARBON NITRIDE ($Cu_2(OH)_3NO_3/CaSiO_3$@g-$C_3N_4$) NANOSTRUCTURE

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Abdel Fattah Omran, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/219,727

(22) Filed: May 27, 2025

(51) Int. Cl.
*C01G 3/08* (2006.01)
*B82Y 40/00* (2011.01)

(52) U.S. Cl.
CPC ............... *C01G 3/08* (2013.01); *B82Y 40/00* (2013.01); *C01P 2002/01* (2013.01); *C01P 2002/72* (2013.01); *C01P 2002/90* (2013.01); *C01P 2004/04* (2013.01); *C01P 2004/16* (2013.01); *C01P 2004/45* (2013.01); *C01P 2004/80* (2013.01); *C01P 2006/12* (2013.01); *C01P 2006/14* (2013.01); *C01P 2006/16* (2013.01)

(58) Field of Classification Search
None
See application file for complete search history.

(56) References Cited

FOREIGN PATENT DOCUMENTS

| CN | 115515900 A | 12/2022 |
|---|---|---|
| CN | 118807808 A | 10/2024 |

OTHER PUBLICATIONS

Thongtem et al.; Inorganic Chemistry Communications; vol. 139, May 2022.*
Ensiyeh Rahmati, et al., "Hantzsch reaction using copper nitrate hydroxide-containing mesoporous silica nanoparticle with · C3N4 framework as a novel powerful and reusable catalyst", Scientific Reports, vol. 13, Article No. 9517 (2023), 12 Pages.
Guangyuan Yao, et al., "Synthesis and enhanced visible-light photocatalytic activity of wollastonite/g-C3N4 composite", Materials Research Bulletin, vol. 86, Feb. 2017, pp. 186-193, 8 pages.

* cited by examiner

*Primary Examiner* — Guinever S Gregorio
(74) *Attorney, Agent, or Firm* — Oblon, McClelland, Maier & Neustadt, L.L.P.

(57) ABSTRACT

A method for synthesizing a $Cu_2(OH)_3NO_3/CaSiO_3$@g-$C_3N_4$ nanostructure includes mixing a calcium silicate ($CaSiO_3$), a graphite-phase carbon nitride (g-$C_3N_4$) and a copper salt in a glycol solvent to form a mixture. The method also includes microwaving the mixture to form the nanostructure having a multi-phase crystalline structure with controlled morphology.

19 Claims, 3 Drawing Sheets

COPPER HYDROXY NITRATE/ CALCIUM SILICATE @GRAPHITE-PHASE CARBON NITRIDE ($Cu_2(OH)_3NO_3/CaSiO_3$@g-$C_3N_4$) NANOSTRUCTURE

BACKGROUND

Technical Field

The present disclosure is directed to a $Cu_2(OH)_3NO_3/CaSiO_3$@g-$C_3N_4$ nanostructure and more particularly copper hydroxy nitrate ($Cu_2(OH)_2NO_3$), calcium silicate ($CaSiO_3$) and graphite-phase carbon nitride (g-$C_3N_4$) based nanostructure material with enhanced structural properties as a promising material for photocatalysis applications.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

The increasing amount of both organic and inorganic contaminants in the environment poses a significant threat to ecosystems and human health. Among these, heavy metal ions are particularly concerning due to their high toxicity, carcinogenic nature and non-biodegradability. These metals, including copper (Cu), cadmium (Cd), lead (Pb) and nickel (Ni), often originate from industrial activities such as metal plating, mining, battery manufacturing and textile production. Their release into water systems can lead to severe ecological damage and bioaccumulation in living organisms, resulting in serious health issues such as cancer, kidney failure and neurological disorders (See: Mandal, A. K, *Nanomaterials as targeted delivery system of therapeutics for inhibition of cancer. Journal of Drug Delivery and Therapeutics*, 2023. 13(12): p. 201-223).

To control heavy metal pollution, several treatment methods have been explored, such as membrane filtration, ion exchange and reverse osmosis on one hand. Adsorption, on the other hand, has gained considerable attention due to its cost-effectiveness, simplicity and high efficiency, especially at trace concentrations. Materials like graphite-phase carbon nitride (g-$C_3N_4$) have emerged as promising candidates for metal ion adsorption and photocatalysis owing to their thermal stability, non-toxicity and responsiveness to visible light (See: Sing, D., et al., *Citric acid coated magnetic nanoparticles: synthesis, characterization and application in removal of Cd (II)ions from aqueous solution. Journal of Water Process Engineering*, 2014. 4: p. 233-241).

Graphite-phase carbon nitride (g-$C_3N_4$), though a promising candidate, still suffers from limitations such as low surface area and fast electron-hole recombination, restricting its performance. To address these issues, researchers have developed several modification methods such as doping g-$C_3N_4$ with metal oxides and incorporating carbon-based nanomaterials. These modifications form a composite with enhanced the porosity, surface area and charge separation, particularly the adsorption and photocatalytic capabilities. Carbon nanomaterials are especially advantageous due to their high electrical conductivity, large surface area, and chemical stability (Ibrahim, T. G., et al., *Eliminating Manifold Pharmaceutical Pollutants with Carbon Nanoparticles Driven via a Short-Duration Ball-Milling Process. Surfaces*, 2024. 7(3): p. 493-507). Their integration into g-$C_3N_4$-based systems not only boosts adsorption efficiency for heavy metals but also improves energy storage capabilities in supercapacitors. Building on these advancements, composites of g-$C_3N_4$ and carbon nanomaterials have emerged as highly promising materials for addressing environmental pollution and advancing energy storage technologies.

Each of the aforementioned conventional methods suffers from one or more drawbacks hindering their widespread adoption, including high operational costs, complex maintenance, limited efficiency at low ion concentrations, and secondary pollution. Accordingly, it is one object of the present disclosure to provide methods and systems for the effective removal of heavy metal ions from contaminated water using carbon nanomaterial composites that overcome these limitations by offering high adsorption capacity, enhanced photocatalytic activity, cost-efficiency and environmental sustainability.

SUMMARY

One aspect of the present disclosure is a method for synthesizing a $Cu_2(OH)_3NO_3/CaSiO_3$@g-$C_3N_4$ nanostructure is described. The method may include mixing a calcium silicate ($CaSiO_3$), a graphite-phase carbon nitride (g-$C_3N_4$) and a copper salt in a glycol solvent to form a mixture and further microwaving the mixture to form the $Cu_2(OH)_3NO_3/CaSiO_3$@g-$C_3N_4$ nanostructure.

In a further embodiment, the $Cu_2(OH)_3NO_3/CaSiO_3$@g-$C_3N_4$ nanostructure may include $Cu_2(OH)_3NO_3$, $CaSiO_3$, and g-$C_3N_4$.

In a further embodiment, a method of forming the $CaSiO_3$ is described. The method may include sonicating a mixture of a calcium salt and a silicate salt in an aqueous alcohol solution to form a calcium silicate mixture, followed by heating the calcium silicate mixture to an elevated temperature to form the $CaSiO_3$. The calcium salt may be selected from a group consisting of calcium nitrate, calcium chloride, calcium phosphate, calcium carbonate and calcium citrate, and the silicate salt may be selected from a group consisting of calcium silicate, sodium silicate, potassium silicate, zeolites and micas.

In a further embodiment, the method of forming g-$C_3N_4$ is described. The method may include forming the g-$C_3N_4$ by heating urea to an elevated temperature for a sufficient amount of time.

In a further embodiment, the mixing may include a copper salt selected from a group consisting of copper nitrate, copper chloride, copper sulfate, copper bromide and copper cyanide.

In a further embodiment, the microwaving may be performed at an elevated temperature under pressure for a sufficient amount of time.

In a further embodiment, the $Cu_2(OH)_3NO_3/CaSiO_3$@g-$C_3N_4$ nanostructure may include a plurality of metal oxides nanorods and a plurality of g-$C_3N_4$ nanosheets.

In a further embodiment, the $Cu_2(OH)_3NO_3/CaSiO_3$@g-$C_3N_4$ nanostructure may have the metal oxide nanorods including $Cu_2(OH)_3NO_3$ and $CaSiO_3$.

In a further embodiment, the $Cu_2(OH)_3NO_3/CaSiO_3$@g-$C_3N_4$ nanostructure may have the metal oxide nanorods of a certain length.

In a further embodiment, the $Cu_2(OH)_3NO_3/CaSiO_3$@g-$C_3N_4$ nanostructure may have the metal oxide nanorods of a certain length at a narrower range.

In a further embodiment, the $Cu_2(OH)_3NO_3/CaSiO_3$@g-$C_3N_4$ nanostructure may have the metal oxides nanorods including nanowires protruding perpendicularly to the rods.

In a further embodiment, the $Cu_2(OH)_3NO_3/CaSiO_3$@g-$C_3N_4$ nanostructure may have the nanowires of a certain length.

In a further embodiment, the $Cu_2(OH)_3NO_3/CaSiO_3$@g-$C_3N_4$ nanostructure may have the nanowires of a certain length at a narrower range.

In a further embodiment, the $Cu_2(OH)_3NO_3/CaSiO_3$@g-$C_3N_4$ nanostructure may have the metal oxides nanorods dispersed on the g-$C_3N_4$ nanosheets.

In a further embodiment, the $Cu_2(OH)_3NO_3/CaSiO_3$@g-$C_3N_4$ nanostructure may have some aggregates of the metal oxides nanorods dispersed on the g-$C_3N_4$ nanosheets.

In a further embodiments, the $Cu_2(OH)_3NO_3/CaSiO_3$@g-$C_3N_4$ nanostructure may have a mesoporous structure with a plurality of wide pores in the g-$C_3N_4$ nanosheets where the metal oxides nanorods deposit.

In a further embodiment, the $Cu_2(OH)_3NO_3/CaSiO_3$@g-$C_3N_4$ nanostructure may have pores with a certain diameter.

In a further embodiment, the $Cu_2(OH)_3NO_3/CaSiO_3$@g-$C_3N_4$ nanostructure may have a certain Brunauer-Emmett-Teller (BET) surface area.

In a further embodiment, the $Cu_2(OH)_3NO_3/CaSiO_3$@g-$C_3N_4$ nanostructure may have a certain pore volume.

In a further embodiment, the $Cu_2(OH)_3NO_3/CaSiO_3$@g-$C_3N_4$ nanostructure may have a certain pore volume at a narrower range.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
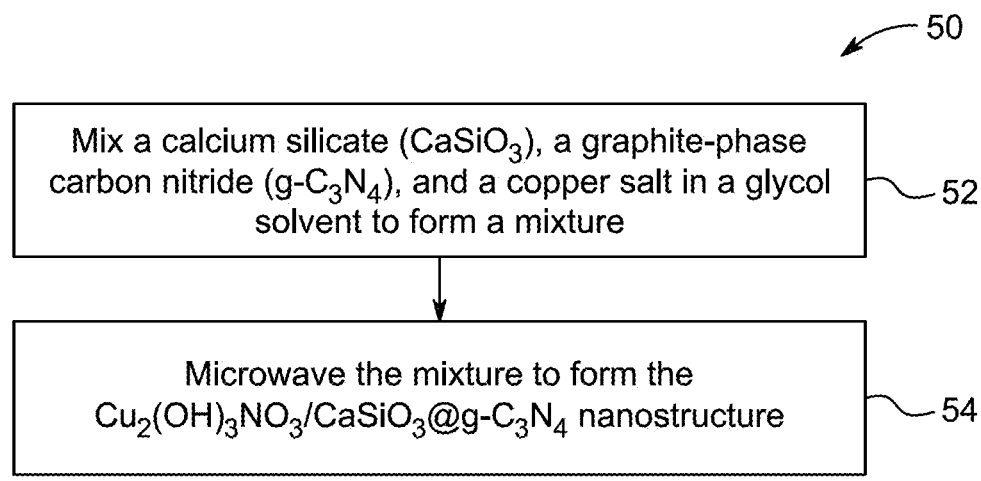
FIG. 1 illustrates an exemplary flow chart for a method of preparation of a $Cu_2(OH)_3NO_3/CaSiO_3$@g-$C_3N_4$, according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "nanoparticles (NPs)" refers to particles having a particle size of 1 nm to 500 nanometers (nm) within the scope of the present invention. The NPs may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof.

As used herein, the term "nanocomposites" refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein the term "nano-heterostructures" refers to nanoscale materials composed of two or more distinct components or phases with different compositions, structures, or properties, joined together at the nanometer scale to form a single integrated structure.

As used herein the term "nanostructure" refers to a material composed of two or more distinct components or phases with different compositions, structures, or properties, joined together to form a single integrated structure, in which at least one dimension of with a structure in a nanometer size scale (<100 nm). Each component may exist in various morphological shapes, such as nanotubes, nanowires, nanospheres, nanocrystals, nanorectangles, nanotriangles, nanopentagons, nanohexagons, nanoprisms, nanodisks, nanocubes, nanoribbons, nanoblocks, nanobeads, nanotoroids, nanodiscs, nanobarrels, nanogranules, nanowhiskers, nanoflakes, nanofoils, nanopowders, nanoboxes, nanostars, tetrapods, nanobelts, nano-urchins, nanoflowers, etc., and mixtures thereof. The nanostructure therefore refers to a poly-phase solid material made up of two or more nanomaterials. The term includes all types of multiphase solid material in which one of the phases has one, two, or three dimensions of less than 100 nm, or structures having nanoscale repeat distances between the different phases that make up the material.

As used herein, the term g-$C_3N_4$ nanosheets refers to thin, two-dimensional sheets of graphitic carbon nitride (g-$C_3N_4$), a material composed of carbon, nitrogen, and hydrogen atoms arranged in a graphitic-like structure. These nanosheets typically have a thickness of several nanometers with a high surface area, and exhibit unique electronic properties, making them suitable for various applications, including photocatalysis, energy storage, and sensing.

The present application relates to "multiple", "multiple", "multiple", "multiple", "multiple", and the like, if not specifically limited, to a number greater than 2 or equal to 2. For example, one or more' means one or more than two.

In this disclosure, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present disclosure, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C. and 1° C.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurred in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically labeled compounds of the disclosure may generally be prepared by conventional techniques known to those skilled in the art or by processes analogous to those described herein, using an appropriate isotopically labeled reagent in place of the non-labeled reagent otherwise employed.

As used herein, the term "porosity" refers to a measure of the void or vacant spaces within a material.

As used herein, the term "pore diameter" refers to an average width or size of the pores (void or vacant spaces) within a material, typically measured in nm or angstroms (Å). It is a key parameter in characterizing the texture and permeability of porous materials, influencing their adsorption, filtration, or catalytic properties.

As used herein, the term "pore volume" refers to the total volume of void spaces (pores) within a material that is capable of being filled by a gas or liquid. It is typically expressed in cubic centimeters per gram ($cm^3/g$) and is an important parameter in characterizing the porous structure of materials, such as adsorbents or catalysts.

As used herein, the term "Barrett-Joyner-Halenda (BJH)" method is a method used to analyze pore size distribution in porous materials, typically from nitrogen adsorption-desorption isotherms. The BJH method is especially useful for characterizing mesoporous materials (with pore sizes between 2 and 50 nm).

As used herein, the term "Transmission electron microscopy (TEM)" refers to a microscopy technique that utilizes a beam of electrons transmitted through a thin sample to form an image. TEM provides high-resolution imaging at the nanometer or even atomic scale, allowing the observation of the internal structure of materials. This method is widely used to examine the morphology, crystallography, and composition of nanoparticles, materials, and biological specimens, offering detailed insights into their microstructure.

An aspect of the present disclosure is directed to a method for the synthesis of a $Cu_2(OH)_3NO_3/CaSiO_3@g-C_3N_4$ nanostructure, also referred to as a nanostructure, consisting of copper hydroxy nitrate ($Cu_2(OH)_3NO_3$), calcium silicate ($CaSiO_3$), and graphite-phase carbon nitride ($g-C_3N_4$). The nanostructured material fabricated by the method of the present disclosure achieves a multi-phase crystalline structure with controlled morphology and enhanced structural properties for wastewater treatment.

FIG. 1 illustrates a schematic flow chart of a method 50 of preparing the $Cu_2(OH)_3NO_3/CaSiO_3@g-C_3N_4$ nanostructure. The order in which the method 50 is described is not intended to be construed as a limitation, and any number of the method steps described can be combined to implement the method 50. Additionally, individual steps may be removed or skipped from the method 50 without departing from the spirit and scope of the present disclosure.

At step 52, the method 50 includes mixing a calcium silicate $CaSiO_3$, a graphite-phase carbon nitride ($g-C_3N_4$), and a copper salt in a glycol solvent to form a mixture. The mixture refers to a homogeneous suspension or dispersion containing the calcium silicate ($CaSiO_3$), the graphite-phase carbon nitride ($g-C_3N_4$), and the copper salt uniformly combined in the glycol solvent, serving as the precursor for nanostructure formation.

In some embodiments, the calcium silicate $CaSiO_3$ is formed by sonicating a mixture of a calcium salt and a silicate salt in an aqueous alcohol solution to form a calcium silicate mixture, and heating the calcium silicate mixture to a temperature of 160 to 200° C. for 1 to 3 hours (h) to form the calcium silicate $CaSiO_3$.

In some embodiments, the calcium salt is at least one selected from calcium nitrate, calcium chloride, calcium phosphate, calcium carbonate, and calcium citrate. In a preferred embodiment, the calcium salt is calcium nitrate. In some embodiments, the silicate salt is at least one selected from potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In some embodiment, the silicate salt is selected from a group consisting of calcium silicate, sodium silicate, potassium silicate, zeolites, and micas. In a preferred embodiment, the silicate salt is sodium metasilicate.

In some embodiments, the aqueous alcohol solution may include at least one alcohol selected from methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, equal moles of calcium nitrate and sodium metasilicate were dispersed in 100 ml of ethanol:water (1:1). Water may be tap water, distilled water, double-distilled water, deionized water, deionized distilled water, reverse osmosis water, and/or some other water.

In some embodiments, the calcium silicate mixture can be heated using heating appliances such as ovens, microwaves, autoclaves, hot plates, heating mantles and tapes, oil baths, salt baths, sand baths, air baths, hot-tube furnaces, and hot-air guns.

In some embodiments, the calcium silicate mixture is heated at a temperature of from 160-200° C., preferably 161-198° C., preferably 162-197° C., preferably 163-196° C., preferably 164-195° C., preferably 165-194° C., preferably 166-193° C., preferably 167-192° C., preferably 168-191° C., preferably 169-190° C., preferably 170-189° C., preferably 171-187° C., preferably 172-188° C., preferably 173-187° C., preferably 174-186° C., preferably 175-185° C., preferably 176-184° C., preferably 177-183° C., preferably 178-182° C., preferably 179-181° C., for 1-3 h, preferably 1.1-2.9 h, preferably 1.2-2.8 h, preferably 1.3-2.7 h, preferably 1.4-2.6 h, preferably 1.5-2.5 h, preferably 1.6-2.4 h, preferably 1.7-2.3 h, preferably 1.8-2.2 h, preferably 1.9-2.1 h to form the $CaSiO_3$. In a preferred embodiment, the mixture is transferred in an autoclave and heated at 180° C. for 2 h in an oven.

In some embodiments, the $g$-$C_3N_4$ is formed by heating urea to a temperature of 550 to 650° C., preferably 555-645° C., preferably 560-640° C., preferably 565-635° C., preferably 570-630° C., preferably 575-625° C., preferably 580-620° C., preferably 585-615° C., preferably 590-610° C., preferably 595-605° C. for 30-60 min, preferably 31-59 min, preferably 32-58 min, preferably 33-57 min, preferably 34-56 min, preferably 35-55 min, preferably 36-54 min, preferably 37-53 min, preferably 38-52 min, preferably 39-51 min, preferably 40-50 min, preferably 41-49 min, preferably 42-48 min, preferably 43-47 min, preferably 44-46 min. In a preferred embodiment, the urea is heated at 600° C. for 45 min.

In an alternate embodiment, other nitrogen-containing precursors, to urea, such as melamine, dicyandiamide, ammonium thiocyanate, or ammonium carbonate, may also be used. These alternatives provide nitrogen necessary for the formation of carbon nitride structures. Typically, these precursors are used in amounts of approximately 5 wt. % relative to the total weight of the nanocomposite to achieve the desired nitrogen content for the desired structural properties.

In some embodiments, the copper salt is selected from a group consisting of copper nitrate, copper chloride, copper sulfate, copper bromide, and copper cyanide.

In some embodiments, the $Cu_2(OH)_3NO_3/CaSiO_3$@$g$-$C_3N_4$ nanostructure includes $Cu_2(OH)_3NO_3$, $CaSiO_3$, and $g$-$C_3N_4$ in a mass ratio of (0.5-1.5):(0.5-1.5):(0.5-1.5), preferably (0.6-1.4):(0.6-1.4):(0.6-1.4), preferably (0.7-1.3):(0.7-1.3):(0.7-1.3), and preferably (0.8-1.2):(0.8-1.2):(0.8-1.2), preferably (0.9-1.1):(0.9-1.1):(0.9-1.1). In a preferred embodiment, the mass ratio of $Cu_2(OH)_3NO_3$, $CaSiO_3$, and $g$-$C_3N_4$ is 1:1:1.

At step 54, the method 50 includes microwaving the mixture to form the $Cu_2(OH)_3NO_3/CaSiO_3$@$g$-$C_3N_4$ nanostructure. In some embodiments, the mixture is microwaved at a temperature of 160-200° C., preferably 161-199° C., preferably 163-197° C., preferably 165-195° C., preferably 167-193° C., preferably 169-191° C., preferably 171-189° C., preferably 173-187° C., preferably 175-185° C., preferably 177-183° C., preferably 178-182° C., preferably 179-181° C., at a pressure of 4 to 6 bar, preferably 4.1-5.9 bar, preferably 4.2-5.8 bar, preferably 4.3-5.7 bar, preferably 4.4-5.6 bar, preferably 4.5-5.5 bar, preferably 4.6-5.4 bar, preferably 4.7-5.3 bar, preferably 4.8-5.2 bar, preferably 4.9-5.1 bar, for 30-90 min, preferably 31-89 min, preferably 33-87 min, preferably 36-85 min, preferably 39-83 min, preferably 41-81 min, preferably 43-79 min, preferably 46-77 min, preferably 49-75 min, preferably 52-73 min, preferably 55-70 min, preferably 57-68 min, preferably 59-65 min. In a preferred embodiment, the mixture is microwaved at 180° C. and 5.0 bar pressure for 60 min to form the nanostructure.

The nanostructure includes a plurality of metal oxides, namely copper hydroxy nitrate ($Cu_2(OH)_3NO_3$), calcium silicate ($CaSiO_3$), and graphite-phase carbon nitride ($g$-$C_3N_4$). In some embodiments, metal oxides and $g$-$C_3N_4$ present in the nanostructure may be in the form of nanorods, nanotubes, nanowires, nanocubes, nanosheets, nanoplates, and nanoflowers. In a preferred embodiment, the nanostructure includes metal oxides in the form of nanorods and the $g$-$C_3N_4$ in the form of nanosheets.

In some embodiments, the nanostructure has metal oxide nanorods including nanowires protruding perpendicularly to the rods. The metal oxides nanorods including nanowires of a length 10-100 nm, preferably 11-90 nm, preferably 12-80 nm, preferably 13-70 nm, preferably 14-60 nm, preferably 15-50 nm, preferably 16-40 nm, preferably 17-30 nm and preferably 18-20 nm. In some embodiments, the nanostructure has the metal oxides nanorods including nanowires of a length 10-50 nm, preferably 11-49 nm, preferably 12-48 nm, preferably 14-46 nm, preferably 16-44 nm, preferably 18-42 nm, preferably 20-40 nm, preferably 22-38 nm, preferably 24-36 nm, preferably 26-34 nm, preferably 28-32 nm and preferably 30-31 nm.

In a preferred embodiment, the nanostructure has the metal oxide nanorods dispersed on the $g$-$C_3N_4$ nanosheets and has some aggregates of the metal oxide nanorods dispersed on the $g$-$C_3N_4$ nanosheets. In some embodiments, the nanostructure has the metal oxide nanorods of an average length 1-10 micrometer (μm), preferably 1.1-9.9 μm, preferably 1.2-9.7 μm, preferably 1.3-9.5 μm, preferably 1.4-9.3 μm, preferably 1.5-9 μm, preferably 1.6-8.9 μm, preferably 1.7-8.5 μm, preferably 1.8-8.3 μm, preferably 1.90-8 μm, preferably 1.91-7 μm, preferably 1.92-6 μm, preferably 1.93-5 μm, preferably 1.94-4 μm, preferably 1.95-3 μm and preferably 1.96-2 μm.

In some embodiments, the nanostructure has the metal oxide nanorods of an average length 1-3 μm, preferably 1.1-2.9 μm, preferably 1.2-2.8 μm, preferably 1.3-2.7 μm, preferably 1.4-2.6 μm, preferably 1.5-2.5 μm, preferably 1.6-2.4 μm, preferably 1.7-2.3 μm, preferably 1.8-2.2 μm, preferably 1.9-2.1 μm, preferably 1.91-2.0 μm, preferably 1.92-1.99 μm, preferably 1.93-1.98 μm. In a preferred embodiment, the average length of metal oxide nanorods in the heterostructure is 1.97 μm.

In some embodiments, the nanostructure is porous. A porous material forms a porous bulk solid. Pores may be micropores, mesopores, macropores, and/or a combination thereof. The pores exist in the bulk material, not necessarily in the molecular structure of the material. The term "microporous" means that nanostructures have pores with an average pore width (i.e., diameter) of less than 2 nm. The term 'mesoporous' means the pores of the nanostructure have an average pore width of 2-50 nm. The term "microporous" means the pores of nanostructure have an average pore width larger than 50 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT). In a preferred embodiment, the nanostructure has a mesoporous structure with a plurality of wide pores in the g-$C_3N_4$ nanosheets into which the metal oxide nanorods are deposited.

In some embodiments, the nanostructure has a BET surface area of 140-160 square meters per gram ($m^2 \cdot g^{-1}$), preferably 141-159 $m^2 \cdot g^{-1}$, preferably 141.2-158.9 $m^2 \cdot g^{-1}$, preferably 141.4-158.7 $m^2 \cdot g^{-1}$, preferably 141.6-158.5 $m^2 \cdot g^{-1}$, preferably 141.8-158.2 $m^2 \cdot g^{-1}$, preferably 142-158 $m^2 \cdot g^{-1}$, preferably 142.2-157.9 $m^2 \cdot g^{-1}$, preferably 142.4-157.7 $m^2 \cdot g^{-1}$, preferably 142.6-157.5 $m^2 \cdot g^{-1}$, preferably 142.8-157.3 $m^2 \cdot g$-1, preferably 143-157 $m^2 \cdot g$-1, preferably 143.2-156.8 $m^2 \cdot g^{-1}$, preferably 143.4-156.4 $m^2 \cdot g^{-1}$, preferably 143.6-156.2 $m^2 \cdot g^{-1}$, preferably 143.8-156 $m^2 \cdot g^{-1}$, preferably 144-155.8 $m^2 \cdot g^{-1}$, preferably 144.4-155.4 $m^2 \cdot g^{-1}$, preferably 144.8-155 $m^2 \cdot g^{-1}$, preferably 145-154.8 $m^2 \cdot g^{-1}$, preferably 145.4-154.4 $m^2 \cdot g^{-1}$, preferably 145.8-154 $m^2 \cdot g^{-1}$, preferably 146-153.8 $m^2 \cdot g^{-1}$, preferably 146.4-153.4 $m^2 \cdot g^{-1}$, preferably 146.8-153 $m^2 \cdot g^{-1}$, preferably 147-152.8 $m^2 \cdot g^{-1}$, preferably 147.4-152.4 $m^2 \cdot g^{-1}$, preferably 147.8-152 $m^2 \cdot g^{-1}$, preferably 148-151.8 $m^2 \cdot g^{-1}$, preferably 148.4-151.4 $m^2 \cdot g^{-1}$ and preferably 149.8-151 $m^2 \cdot g^{-1}$. In a preferred embodiment, the surface area of the nanostructure is 149.9 $m^2 \cdot g^{-1}$.

The BET hypothesis is the foundation for a significant analysis method for determining the specific surface area of a material. It attempts to explain the physical adsorption of gas molecules on a solid surface. Specific surface area is a property of solids, which is the total surface area of a material per unit of mass, solid or bulk volume, or cross-sectional area. In some embodiments, pore diameter, pore volume, and BET surface area are measured by gas adsorption analysis, preferably $N_2$ adsorption analysis (e.g., $N_2$ adsorption isotherms).

In some embodiments, the average pore distribution of the nanostructure may include, but is not limited to, crystalline average pore distribution, bimodal, trimodal, multimodal, narrow, broad, and Gaussian. In a preferred embodiment, the average pore distribution of the nanostructure is unimodal, indicating a single dominant pore size within the material. This unimodal distribution suggests that the nanostructures possess a relatively narrow pore size range, resulting in more uniform pore structures and enhancing specific properties such as adsorption capacity, catalytic activity, or surface reactivity.

In some embodiments, the nanostructure has an average pore diameter of 3-7 nm, preferably 3.1-6.9 nm, preferably 3.2-6.8 nm, preferably 3.3-6.7 nm, preferably 3.4-6.6 nm, preferably 3.5-6.5 nm, preferably 3.6-6.4 nm, preferably 3.7-6.3 nm, preferably 3.8-6.2 nm, preferably 3.9-6.1 nm, preferably 4.0-6.0 nm, preferably 4.1-5.9 nm, preferably 4.2-5.8 nm, preferably 4.3-5.7 nm, preferably 4.4-5.6 nm, preferably 4.5-5.4 nm, preferably 4.6-5.3 nm, preferably 4.7-5.2 nm and preferably 4.8-5.1 nm. In a preferred embodiment, the average pore diameter of the nanostructure is 5 nm.

In some embodiments, the nanostructure has an average pore volume of 0.1-0.5 cubic centimeters per gram ($cm^3 \cdot g^{-1}$), preferably 0.11-0.49 $cm^3 \cdot g^{-1}$, preferably 0.12-0.48 $cm^3 \cdot g^{-1}$, preferably 0.13-0.47 $cm^3 \cdot g^{-1}$, preferably 0.14-0.46 $cm^3 \cdot g^{-1}$, preferably 0.15-0.45 $cm^3 \cdot g^{-1}$, preferably 0.16-0.44 $cm^3 \cdot g^{-1}$, preferably 0.17-0.43 $cm^3 \cdot g^{-1}$, preferably 0.18-0.42 $cm^3 \cdot g^{-1}$, preferably 0.20-0.41 $cm^3 \cdot g^{-1}$, preferably 0.21-0.40 $cm^3 \cdot g^{-1}$, preferably 0.22-0.39 $cm^3 \cdot g^{-1}$, preferably 0.23-0.38 $cm^3 \cdot g^{-1}$, preferably 0.24-0.37 $cm^3 \cdot g^{-1}$ and preferably 0.25-0.36 $cm^3 \cdot g^{-1}$.

In some embodiments, the nanostructure has an average pore volume of 0.3-0.4 $cm^3 \cdot g^{-1}$, preferably 0.31-0.39 $cm^3 \cdot g^{-1}$, preferably 0.32-0.38 $cm^3 \cdot g^{-1}$, preferably 0.33-0.37 $cm^3 \cdot g^{-1}$, and preferably 0.34-0.36 $cm^3 \cdot g^{-1}$. In a preferred embodiment, the average pore volume of the nanostructure is 0.354 $cm^3 \cdot g^{-1}$.

EXAMPLES

The following examples demonstrates a copper hydroxy nitrate/calcium silicate @graphite-phase carbon nitride ($Cu_2(OH)_3NO_3/CaSiO_3@g-C_3N_4$) nanostructure material and method of preparation thereof. The examples are provided solely for illustration and are not to be construed as limitations of the present disclosure, as many variations thereof are possible without departing from the spirit and scope of the present disclosure.

Example 1: Fabricating the Calcium Silicate ($CaSiO_3$)

Equal moles of calcium nitrate and sodium metasilicate were dispersed in 100 milliliters (mL) of ethanol:water (1:1) in a 150 mL beaker and sonicated for 15 minutes (min). The mixture was then transferred to a 200 mL autoclave and placed in an oven operated at 180 degrees Celsius (° C.) for 2.0 hour (h). The product was further dispersed in 500 mL distilled water with an ultrasonic bath for 10 min, filtered via a Buchner system, rinsed with distilled water, and dried at 120° C. for 1.0 h.

Example 2: Fabricating the Graphite-Phase Carbon Nitride (g-$C_3N_4$)

About 30.0 gram (g) of urea was placed in a 100 mL crucible and closed with its porcelain cover. The hall crucible and cover were wrapped with three layers of aluminum foil to reduce the urea loss of evaporation. The crucible was finally heated via a furnace set at 600° C. for 45 min.

Example 3: Fabricating the $Cu_2(OH)_3NO_3/CaSiO_3/$ g-$C_3N_4$

For the synthesis of $Cu_2(OH)_3NO_3/CaSiO_3/g-C_3N_4$ nanostructure about 2.0 g of $CaSiO_3$, 2.0 g of g-$C_3N_4$ and the amount of $Cu(NO_3)_2 \cdot 3H_2O$ enough to produce 2.0 g of $Cu_2(OH)_2NO_3$ were transferred to a mono wave-200 vial (G30), dispersed in 20 mL ethylene glycol monomethyl ether via an ultrasonic bath for 30 min. The vial was closed with its Teflon cover and placed in the Anton-Baar Monowave-200 operated at 180° C. and 5.0 bar pressure for one hour. The product was dispersed in 1 liter (L) of distilled water with an ultrasonic bath for 30 min, filtered via a Buchner system, rinsed with distilled water, and dried at 150° C. for 2.0 h.

Figure 2:
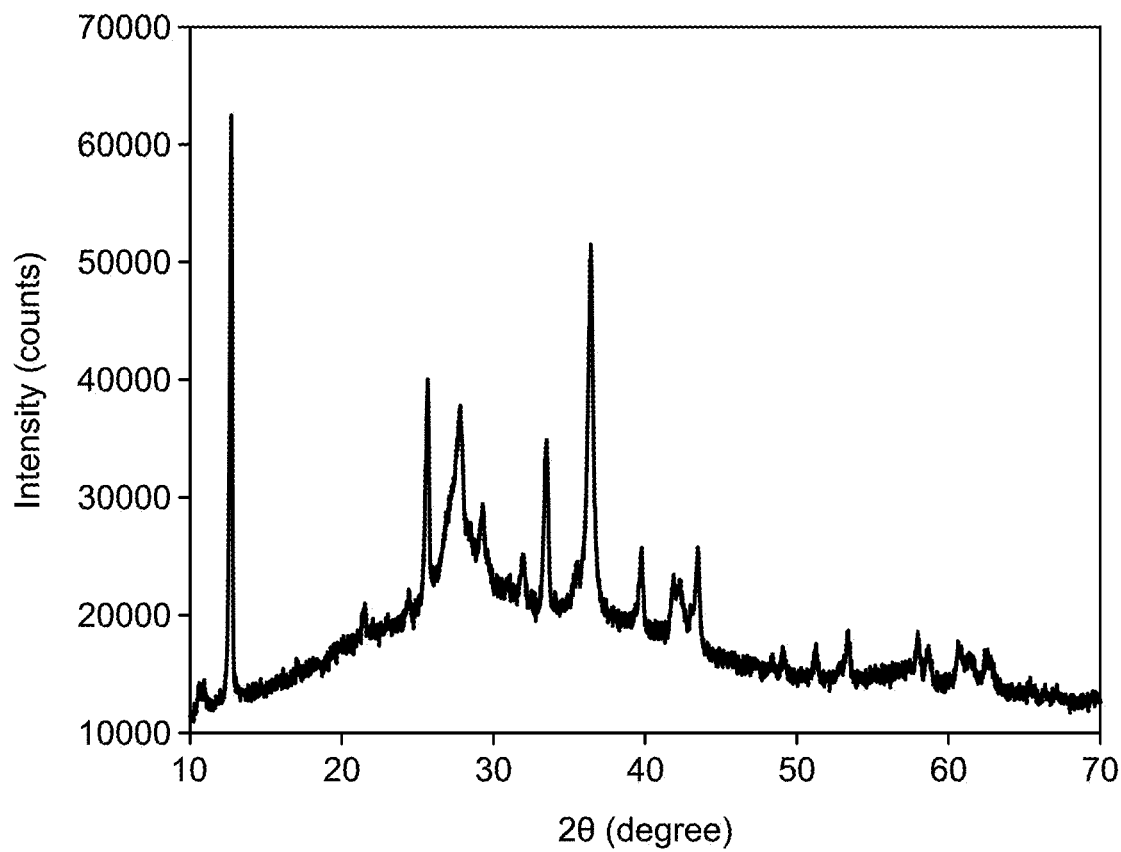
FIG. 2 shows X-ray diffraction (XRD) diffractogram of the $Cu_2(OH)_3NO_3/CaSiO_3$@g-$C_3N_4$ nanostructure, according to certain embodiments.

The crystallinity and phases identification present in $Cu_2(OH)_3NO_3/CaSiO_3@g-C_3N_4$ nanostructure were analyzed by X-ray diffraction (XRD), and the results are shown in FIG. 2. The intense peaks and high intensity values indicate that the powder is highly crystalline. In addition, the peak broadening indicates the small particle size of the prepared composites. Examination of the diffraction patterns with the standard JCPDS cards reveals the presence of metallic nanosheets of copper (II) hydroxy nitrate ($Cu_2(OH)_2NO_3$) as a major phase, together with minor phases of copper oxide ($Cu_2O$), $CaSiO_3$, and g-$C_3N_4$. The $Cu_2(OH)_2NO_3$ phase was indexed to the strong reflections at 2θ values of 12.9°, 25.7°, 33.8°, 36.7° and 43.4° (JCPDS No. 00-003-0061). The $CaSiO_3$ monoclinic phase (JCPDS No. 00-001-0720) was detected at 2θ values of 27.3°, 32.3°, and 62.6°. The $Cu_2O$ was characterized by a strong reflection at a 2θ value of 36.4° (JCPDS No. 01-078-2076). The diffractions related to g-$C_3N_4$ were observed at 33.2° and 58.0° (COD No. 1534042 and JCPDS No. 00-050-0848). The weak diffractions of both $CaSiO_3$ and g-$C_3N_4$ may be attributed to the semi-crystalline nature of these phases and the high crystallinity of $Cu_2O$ and $Cu_2(OH)_2NO_3$ phases in the prepared composite. No other phases were detected, indicating the successful fabrication of the nanostructure.

Figure 3A:
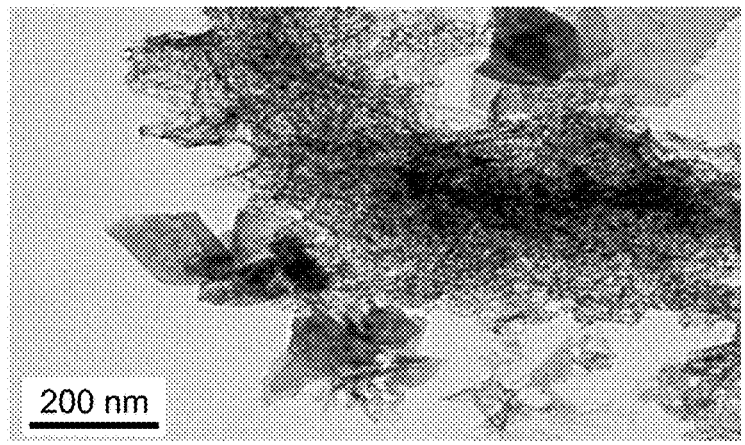
FIG. 3A shows a transmission electron microscopy (TEM) image of the $Cu_2(OH)_3NO_3/CaSiO_3$@g-$C_3N_4$ nanostructure at 200 nanometer (nm) magnification, according to certain embodiments.
Figure 3B:
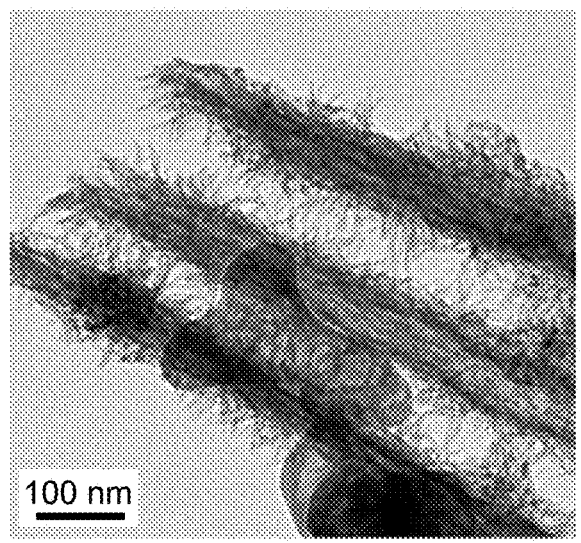
FIG. 3B shows a transmission electron microscopy (TEM) image of the $Cu_2(OH)_3NO_3/CaSiO_3$@g-$C_3N_4$ nanostructure at 100 nm magnification, according to certain embodiments.
Figure 3C:
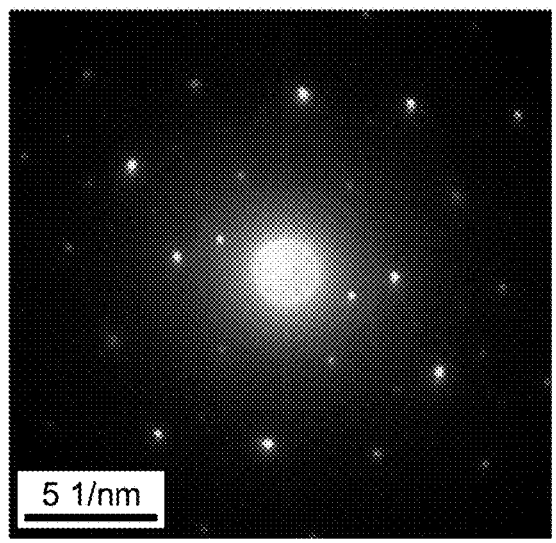
FIG. 3C shows a selected area electron diffraction (SAED) pattern of the $Cu_2(OH)_3NO_3/CaSiO_3$@g-$C_3N_4$ nanostructure, according to certain embodiments.

Transmission electron microscopy (TEM) images of $Cu_2(OH)_3NO_3/CaSiO_3/g$-$C_3N_4$ nanostructure were presented in FIG. 3. The TEM images showed two-dimensional porous structure constructed with curled and wrinkled nanosheets and platelets of the g-$C_3N_4$ at 200 nanometer (nm) magnification (FIG. 3A) and 100 nm magnification (FIG. 3B). The image also showed well dispersion of rods metal oxides nanoparticles with size 1.97 micrometer (m) and some aggregates on nanosheets of g-$C_3N_4$. The corresponding selected area electron diffraction (SAED) pattern, as shown in FIG. 3C, reveals diffraction spots with interplanar spacing of 0.365 nanometer (nm), 0.242 nm, 0.141 nm, and 0.124 nm due to ($CaSiO_3$: 2-12, $Cu_2(NO_3)(OH)_3$: −111), ($CaSiO_3$: −2-12, $Cu_2(NO_3)(OH)_3$: −211), ($CaSiO_3$: 322, $Cu_2(NO_3)(OH)_3$: 00-5), and ($CaSiO_3$: −125) diffraction planes.

Figure 4A:
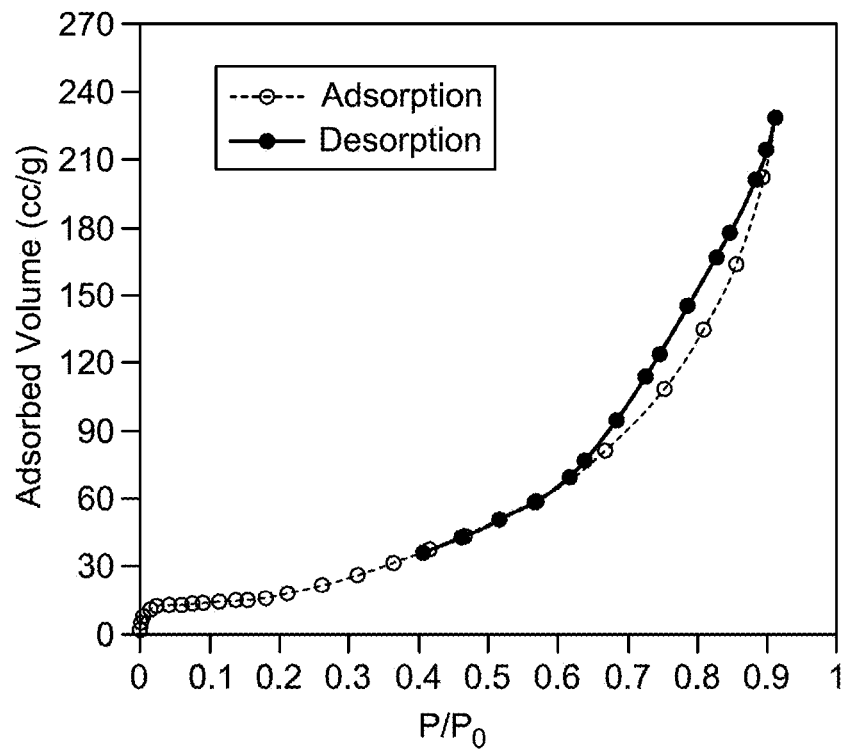
FIG. 4A is a graph depicting nitrogen ($N_2$) adsorption-desorption isotherms of the $Cu_2(OH)_3NO_3/CaSiO_3$@g-$C_3N_4$ nanostructure, according to certain embodiments.
Figure 4B:
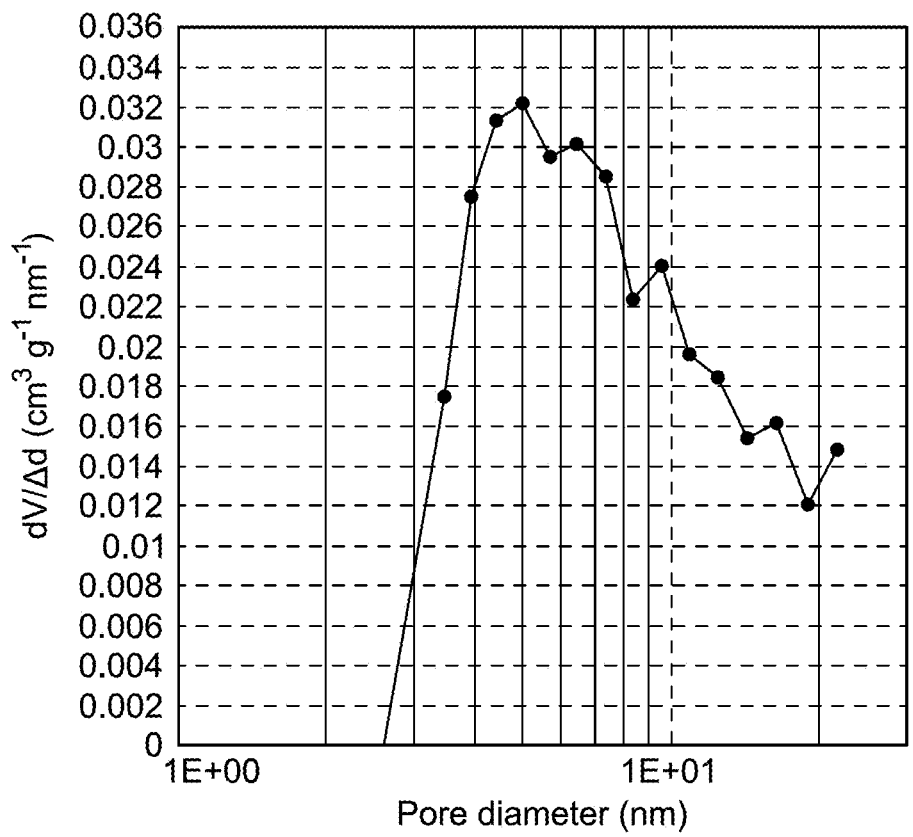
FIG. 4B is a graph depicting pore size distribution curve of the $Cu_2(OH)_3NO_3/CaSiO_3$@g-$C_3N_4$ nanostructure, according to certain embodiments.

FIG. 4 displays the nitrogen adsorption-desorption isotherms of $Cu_2(OH)_3NO_3/CaSiO_3@g$-$C_3N_4$ nanostructure. The nitrogen sorption isotherm of the composite is belonging to type IV isotherm with noticed hysteresis loop, indicating the formation of mesoporous structures (FIG. 4A). However, shifting the loop to a relatively higher pressure ($P/P_0$=0.62-1) suggests the presence of wide mesopores, which may result from the deposition of metal oxides particles in the wide pores of g-$C_3N_4$. Furthermore, the Brunauer-Emmett-Teller (BET) surface area of the nanostructure was calculated to be 149.9 square meters per gram ($m^2 \cdot g^{-1}$). The marked high specific surface area reflects the good dispersion of these metal oxides nanoparticles on g-$C_3N_4$. and $CaSiO_3$. Moreover, the pore size distribution curves, plotted using the Barrett-Joyner-Halenda (BJH) method, for the nanostructure exhibited unimodal distribution with average pore diameters maximized at 5 nm and pore volume of 0.354 cubic centimeters per gram ($cm^3 \cdot g^{-1}$) (FIG. 4B). All the isotherms belong to the category H3 type of pores, which do not exhibit limiting adsorption at high $P/P_0$ and arise due to aggregation of plate-like particles giving rise to slit-shaped pores. This indicates that the assembly of the nanostructure provoked a mesoporous structure.

Numerous modifications and variations of the present disclosure are possible in light of the above teachings. It is therefore to be understood that within the scope of the appended claims, the invention may be practiced otherwise than as specifically described herein.

The invention claimed is:

1. A method for synthesizing a copper hydroxy nitrate/calcium silicate @graphite-phase carbon nitride ($Cu_2(OH)_3NO_3/CaSiO_3@g$-$C_3N_4$) nanostructure, comprising:
   mixing a calcium silicate ($CaSiO_3$), a graphite-phase carbon nitride (g-$C_3N_4$), and a copper salt in a glycol solvent to form a mixture;
   microwaving the mixture to form the $Cu_2(OH)_3NO_3/CaSiO_3@g$-$C_3N_4$ nanostructure,
   wherein the $Cu_2(OH)_3NO_3/CaSiO_3$ v-$C_3N_4$ nanostructure comprises $Cu_2(OH)_3NO_3$, $CaSiO_3$, and g-$C_3N_4$ in a mass ratio of (0.5-1.5):(0.5-1.5):(0.5-1.5).

2. The method of claim 1, further comprising:
   forming the g-$C_3N_4$ by heating urea to a temperature of 550 to 650° C. for 30 to 60 minutes (min).

3. The method of claim 1, wherein the mixing comprises a copper salt selected from a group consisting of copper nitrate, copper chloride, copper sulfate, copper bromide and copper cyanide.

4. The method of claim 1, wherein the $Cu_2(OH)_3NO_3/CaSiO_3@g$-$C_3N_4$ nanostructure comprises a plurality of metal oxides nanorods and a plurality of g-$C_3N_4$ nanosheets.

5. The method of claim 1, wherein the $Cu_2(OH)_3NO_3/CaSiO_3@g$-$C_3N_4$ nanostructure has the metal oxide nanorods comprising $Cu_2(OH)_3NO_3$ and $CaSiO_3$.

6. The method of claim 1, wherein the $Cu_2(OH)_3NO_3/CaSiO_3@g$-$C_3N_4$ nanostructure has the metal oxide nanorods of an average length 1 to 10 micrometer (μm).

7. The method of claim 1, wherein the $Cu_2(OH)_3NO_3/CaSiO_3@g$-$C_3N_4$ nanostructure has the metal oxide nanorods of an average length 1 to 3 μm.

8. The method of claim 1, wherein the $Cu_2(OH)_3NO_3/CaSiO_3@g$-$C_3N_4$ nanostructure has the metal oxides nanorods comprising nanowires protruding perpendicularly to the rods.

9. The method of claim 1, wherein the $Cu_2(OH)_3NO_3/CaSiO_3@g$-$C_3N_4$ nanostructure has the metal oxides nanorods comprising nanowires of a length 10 to 100 nanometer (nm).

10. The method of claim 1, wherein the $Cu_2(OH)_3NO_3/CaSiO_3@g$-$C_3N_4$ nanostructure has the metal oxides nanorods comprising nanowires of a length 10 to 50 nm.

11. The method of claim 1, wherein the $Cu_2(OH)_3NO_3/CaSiO_3@g$-$C_3N_4$ nanostructure has the metal oxides nanorods dispersed on the g-$C_3N_4$ nanosheets.

12. The method of claim 1, wherein the $Cu_2(OH)_3NO_3/CaSiO_3@g$-$C_3N_4$ nanostructure has some aggregates of the metal oxides nanorods dispersed on the g-$C_3N_4$ nanosheets.

13. The method of claim 1, wherein the $Cu_2(OH)_3NO_3/CaSiO_3@g$-$C_3N_4$ nanostructure has a mesoporous structure with a plurality of wide pores in the g-$C_3N_4$ nanosheets where the metal oxides nanorods deposit.

14. The method of claim 1, wherein the $Cu_2(OH)_3NO_3/CaSiO_3@g$-$C_3N_4$ nanostructure has an average pore diameter of 3 to 7 nm.

15. The method of claim 1, wherein the $Cu_2(OH)_3NO_3/CaSiO_3@g$-$C_3N_4$ nanostructure has a Brunauer-Emmett-Teller (BET) surface area of 140 to 160 square meters per gram ($m^2 \cdot g^{-1}$).

16. The method of claim 1, wherein the $Cu_2(OH)_3NO_3/CaSiO_3@g$-$C_3N_4$ nanostructure has an average pore volume of 0.1 to 0.5 cubic centimeters per gram ($cm^3 \cdot g^{-1}$).

17. The method of claim 1, wherein the $Cu_2(OH)_3NO_3/CaSiO_3@g$-$C_3N_4$ nanostructure has an average pore volume of 0.3 to 0.4 $cm^3 \cdot g^{-1}$.

18. A method for synthesizing a copper hydroxy nitrate/calcium silicate @graphite-phase carbon nitride ($Cu_2(OH)_3NO_3/CaSiO_3@g$-$C_3N$) nanostructure, comprising:
   forming a calcium silicate ($CaSiO_3$) by sonicating a mixture of a calcium salt and a silicate salt in an aqueous alcohol solution to form a calcium silicate mixture, followed by
   heating the calcium silicate mixture to a temperature of 160 to 200 degrees Celsius (° C.) for 1 to 3 hours (h) to form the $CaSiO_3$,
   wherein the calcium salt is selected from a group consisting of calcium nitrate, calcium chloride, calcium phosphate, calcium carbonate and calcium citrate, and wherein the silicate salt is selected from a group consisting of calcium silicate, sodium silicate, potassium silicate, zeolites and micas, mixing the $CaSiO_3$, a graphite-phase carbon nitride ($g-C_3N_4$), and a copper salt in a glycol solvent to form a mixture;

microwaving the mixture to form the $Cu_2(OH)_3NO_1/CaSiO_3@g-C_3N_4$ nanostructure.

19. A method for synthesizing a copper hydroxy nitrate/calcium silicate @graphite-phase carbon nitride ($Cu_2(OH)_3NO_3/CaSiO_3@g-C_3N$) nanostructure, comprising:

mixing a calcium silicate ($CaSiO_3$), a graphite-phase carbon nitride ($g-C_3N_4$) and a copper salt in a glycol solvent to form a mixture;

microwaving the mixture to form the $Cu_2(OH)_3NO_3/CaSiO_3@g-C_3N_4$ nanostructure, wherein the microwaving is performed at a temperature of 160 to 200° C. at a pressure of 4 to 6 bar for 30 to 90 min.

* * * * *